Feb. 6, 1934.    B. P. SCHILTZ    1,945,535
BROACHING TOOL
Filed Jan. 26, 1932
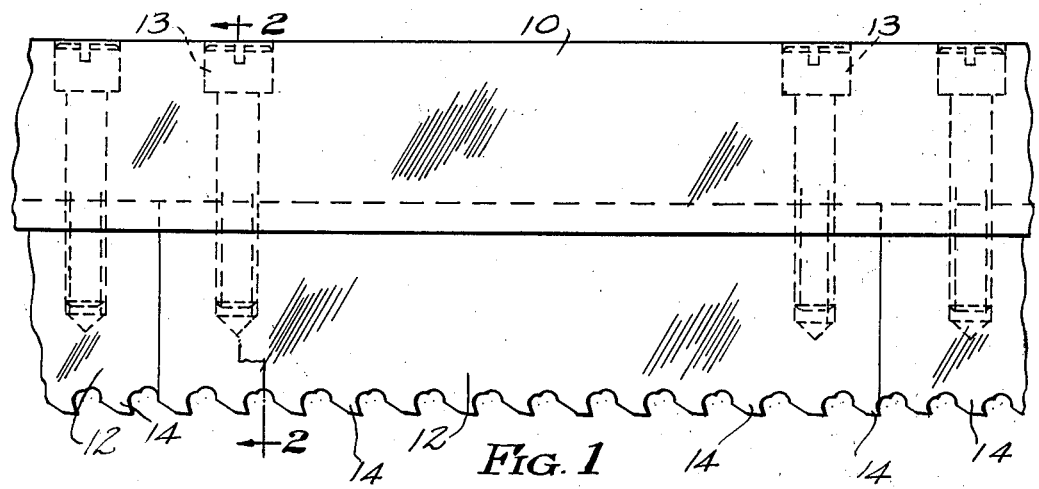
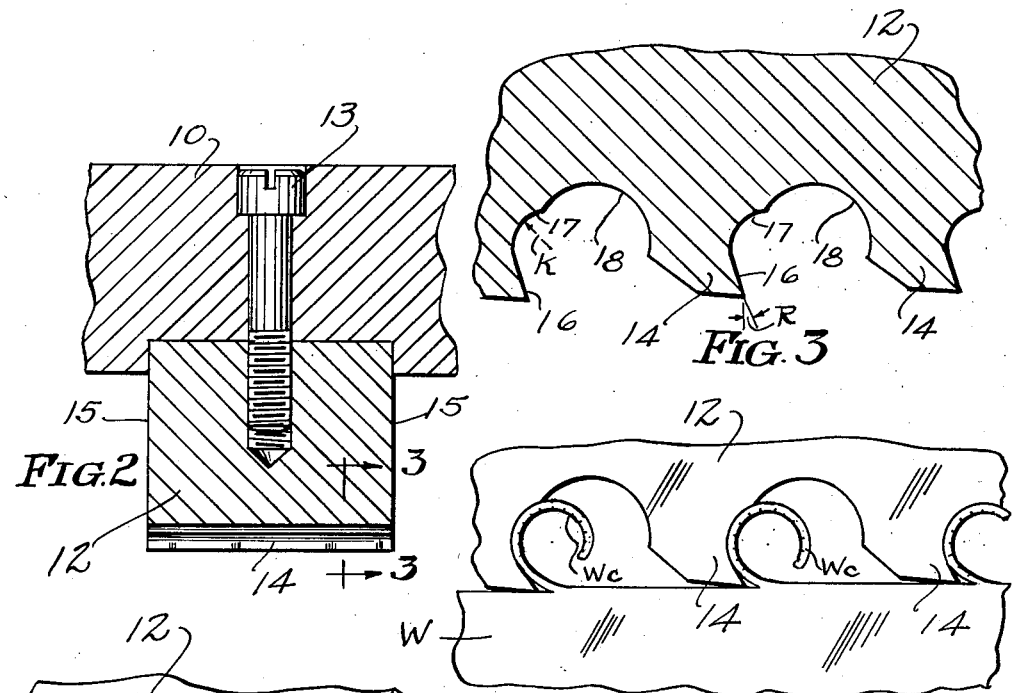
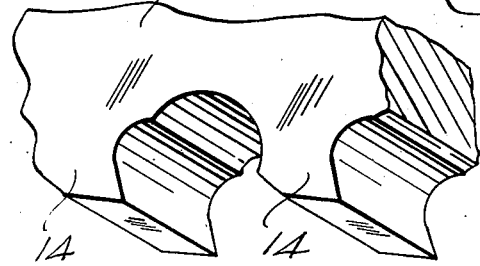

Patented Feb. 6, 1934

1,945,535

UNITED STATES PATENT OFFICE 1,945,535

BROACHING TOOL

Bernard P. Schiltz, Cleveland, Ohio, assignor to The Foote Burt Company, Cleveland, Ohio, a corporation of Ohio Application January 26, 1932. Serial No. 588,856

2 Claims. (Cl. 90—33)

This invention is directed to improvements in metal cutting tools and particularly to broaching tools, and the general object thereof is the provision of a broaching tool having a multiplicity of cutting teeth, each having an interrelated rake and flute formation directed to the prevention of the sticking or clogging of the flutes with chips cut from the work by the teeth.

Other objects of my invention will become apparent from the description hereinafter set forth, and which pertains to the accompanying drawing.

In the drawing Fig. 1 is a side view of a broach tool and a holder therefor, embodying the features of my invention; Fig. 2 is a cross section taken through the broach holder and tool and substantially along the line 2—2 of Fig. 1; Fig. 3 is an enlarged fragmentary view along the line 3—3 of Fig. 2; Fig. 4 is an enlarged fragmentary side view illustrating the action of the cutting teeth upon a piece of work, while Fig. 5 is a fragmentary perspective of two of the multiplicity of teeth, comprising the face of the tool.

Recent developments in the machine tool art have brought into use so-called broaching machines adapted to the machining of open face work, as distinguished from prior well known broaching machines, which were adapted to finish internal surfaces of holes formed in the work. This new type of broaching machine has been adapted to machining operations heretofore effected by milling and planing machines.

In connection with this new type of machine, broaching tools are utilized which comprise a series of cutting teeth formed in a substantially common plane in the faces of blocks of tool steel, the blocks preferably being mounted upon a tool holder. The relatively high cutting speeds at which such tools can be passed over the face of the work to be finished, or vice versa, the speeds of the work as it passes along the tool teeth are such that problems of cutting lubrication and chip disposal practically determine the rate of production of said machine tools.

I have found that by predetermining the rake of each cutting tooth of the tool to obtain best results in cutting speed and accuracy of finished surface and by modifying the usual flute formation relative to the rake angle and by departing from the usual flute curvatures that I can obtain disposition of the chips in a satisfactory manner without interfering in any way with the proper application of the cutting lubricant or compound to the work as the same is being cut by the tool teeth.

In the drawing I show one form of my invention, comprising a tool holder 10, suitably slotted to firmly support a cutting tool 12, and the cutting tool is secured to the holder in any appropriate manner, such as screw members 13. Any number of the cutting tool blocks 12 may be utilized, as desired. In Fig. 1, at least 3 of the blocks 12 are illustrated. This tool holder may be utilized in a broaching machine of the type wherein the tool is stationary and the work moves past the tool or vice versa as the tool is reciprocated and the work held stationary.

In the particular illustration the teeth 14 are ground to have a cutting rise of about two and one-half thousandths inch per tooth, whereby progressive cuts on the work are taken, as illustrated in Fig. 4, where the work is indicated by W, and the teeth have the cutting edges thereof extending normal to the side surfaces of the tool, although there are other instances where the cutting edges of the teeth would extend in relative parallel relation but at an angle to the side faces 15 of the tool. It will be obvious to those skilled in the art that the cutting rise per tooth is varied according to the metallurgical characteristics of the metal comprising the work.

In the instant tool structure, the rake angle R is about 12½° and the face 16 is formed to terminate in an arc K (see Fig. 3), which is of a lesser radius than the normal expanded radius of the chip Wc when the chip curl breaks off, and I interrupt the arc formation 17 by forming a groove 18 of greater depth than the extension of the rake face 16 and arc 17, whereby the chip as it curls becomes suspended out of contact with the lowermost surface of the flute formation and the flute width is made greater than the normal expanded diameter of the curled chip. The tooth pitch or spacing of the teeth of the tool is also such that a substantial body is provided to afford strength to each of the teeth 14.

The arrangement of the groove 18 decreases the contacting surface of the flute with the chips, the degree of friction is reduced and the flute formation is such that when the curl breaks away from the work and expands, it cannot bind itself in the flute. The chips thus have no tendency to become lodged in and clog the flute.

From the foregoing it will be apparent that by reason of the provision of the flute formation shown, the chips have ample opportunity to break and be washed out of the flutes by the cutting compound or cutting lubricant.

I claim:
1. A metal cutting tool having a plurality of parallel cutting teeth with flutes formed therebetween, the forward surface of each tooth comprising a rake surface terminating in a flute arc, said arc terminating in a depressed groove extending to a greater depth into the body of the tool than the rake and said flute arc, and wherein said groove extends into the rearmost section of the preceding tooth wall an amount sufficient to prevent the intersection of the rear surface of the preceding tooth by the flute arc extended.

2. A metal cutting tool having a plurality of parallel cutting teeth with flutes formed therebetween, the forward face of each tooth comprising a rake surface terminating in a flute arc, the rear surface of the preceding tooth being cut away at the base of the tooth to form a groove which extends to a greater depth into the tool than the flute arc, and wherein said groove forms a surface on the rear face of the preceding tooth which is not intersected by said flute arc extended of the following tooth whereby chips cut by the tool are maintained at all times out of contact with the rear surface of the preceding tooth.

BERNARD P. SCHILTZ.